United States Patent
Hiramatsu et al.

(10) Patent No.: US 6,931,729 B2
(45) Date of Patent: Aug. 23, 2005

(54) METHOD FOR MANUFACTURING A FILLER NECK

(75) Inventors: Yasuaki Hiramatsu, Soja (JP); Takayuki Ohmori, Soja (JP)

(73) Assignee: Asteer Co., Ltd., Okayama (JP)

( * ) Notice: Subject to any disclaimer, the term of this patent is extended or adjusted under 35 U.S.C. 154(b) by 9 days.

(21) Appl. No.: 10/643,128

(22) Filed: Aug. 18, 2003

(65) Prior Publication Data

US 2004/0049906 A1 Mar. 18, 2004

(30) Foreign Application Priority Data

Sep. 3, 2002 (JP) ........................................ 2002-258013

(51) Int. Cl.⁷ .......................... B21D 51/16; B23P 17/00
(52) U.S. Cl. .............................. 29/890.09; 29/890.142; 29/428; 219/61.2; 219/61.4; 219/66; 219/81; 219/82; 219/83; 219/84; 219/119
(58) Field of Search ........................ 29/890.09, 890.14, 29/890.142, 428; 137/561, 590, 588, 587; 220/86.2; 219/59.1, 61, 61.2, 61.4, 66, 81, 82, 83, 84, 119

(56) References Cited

U.S. PATENT DOCUMENTS

| | | | | |
|---|---|---|---|---|
| 3,601,450 A | * | 8/1971 | Baker | 301/63.104 |
| 4,715,509 A | * | 12/1987 | Ito et al. | 220/86.2 |
| 5,031,302 A | * | 7/1991 | Anhegger et al. | 29/516 |
| 5,466,016 A | * | 11/1995 | Briody et al. | 285/204 |
| 6,305,408 B1 | * | 10/2001 | Goto et al. | 137/351 |
| 6,330,893 B1 | | 12/2001 | O'Connell | |
| 6,390,124 B1 | * | 5/2002 | Kido et al. | 137/588 |
| 6,474,376 B2 | * | 11/2002 | Hagano et al. | 141/350 |
| 6,588,459 B2 | | 7/2003 | O'Connell | |
| 6,615,489 B2 | * | 9/2003 | Yoshida et al. | 29/890.14 |
| 6,681,817 B2 | * | 1/2004 | Hagano et al. | 141/348 |
| 6,757,974 B2 | * | 7/2004 | Kido et al. | 29/890.14 |
| 6,810,573 B2 | * | 11/2004 | Morinaga et al. | 29/458 |
| 2002/0190065 A1 | * | 12/2002 | Yoshida et al. | 220/86.2 |
| 2003/0173776 A1 | * | 9/2003 | Morohoshi et al. | 285/189 |

FOREIGN PATENT DOCUMENTS

| | | | | |
|---|---|---|---|---|
| JP | 58093577 A | * | 6/1983 | ........... B23K/9/225 |
| JP | 6-20824 | | 3/1994 | |
| JP | 6-12987 | | 4/1994 | |
| JP | 09-066747 | | 3/1997 | |
| JP | 09249036 A | * | 9/1997 | ........... B60K/15/04 |
| JP | 2000159296 A | * | 6/2000 | ........... B67D/5/02 |
| JP | 2002203277 A | * | 7/2002 | ........... G07F/11/34 |

* cited by examiner

*Primary Examiner*—Essama Omgba
(74) *Attorney, Agent, or Firm*—Koda & Androlia

(57) ABSTRACT

In response to the recent various requests, the present invention provides a method for manufacturing filler neck to facilitate jointing a mouthpiece and a feeding pipe which were manufactured separately into an integrated filler neck having an excellent hermeticity. The method for manufacturing a filler neck 1 comprises the following steps: jointing an inner face of the circumferential wall portion 16 of a feeding pipe and an outer face of the circumferential wall portion 12 of the mouthpiece, and integrating with the mouthpiece 2 and the feeding pipe 3, wherein the outer of the mouthpiece and the inner face of the feeding pipe are in relation to be fitted in a press-fitted condition, a seam welding is executed to the welding area W provided in a range of the overlapped area S defined by the width of the circumferential wall portions.

5 Claims, 4 Drawing Sheets

METHOD FOR MANUFACTURING A FILLER NECK

BACKGROUND OF THE INVENTION

1. Field of the Invention

The present invention relates to a method for manufacturing a filler neck for feeding fuel into a feeding pipe of a motor vehicle or the like.

2. Description of the Related Art

From the viewpoint of efficiency in feeding fuel, reduction of manufacturing cost, or reduction of weight of the product, a pipe having a smaller diameter relative to the conventional pipe is often employed as a feeding pipe, recently. However, the legal regulations require a mouthpiece of the filler neck to have the diameter as large as that of the conventional one, so that it tends to become a larger diameter of the mouthpiece relative to that of the feeding pipe. In a case of a feeding pipe having a large diameter, it can be used as the filler neck as it is enlarged diameter of edge portion of the feeding pipe. To the contrary, a feeding pipe having a smaller diameter requires an additional step to joint a mouthpiece manufactured separately to the feeding pipe to form a filler neck. (JP-A-H09-066747, JP-B-H06-020824, JP-U-H06-012987, U.S. Pat. No. 6,330,893, U.S. Pat. No. 6,588,459, etc.)

Specifically, the conventional filler necks are formed by fitting a circumferential wall portion of the mouthpiece in the feeding pipe, and by jointing the overlapped circumferential wall portions. The conventional jointing methods are exemplified by MAG welding, TIG welding and brazing. In general, the joint portion between the mouthpiece and the feeding pipe requires sufficient hermeticity. Thus, a presence of clearance for filling sub-welding materials or for brazing is required between the mouthpiece and the feeding pipe. That is, conventional joint methods require an additional procedure for filling the clearance between the mouthpiece and the feeding pipe so as to be completely sealed after the junction process.

In addition, by the MAG welding or the TIG welding, it is hard to keep hermeticity of the joint portion because of burning through a peripheral edge of the feeding pipe. These welding methods also cause inevitable scattering of the welding spatters which cause danger in the welding environment. Moreover, both the methods increase manufacturing costs of the process of forming the joint between a mouthpiece and a feeding pipe due to applying sub-materials for and welding at low-speed. In a case of manufacturing a filler neck in a variety of sizes in small runs, variation in the size of a mouthpiece and a feeding pipe causes the quality of welding finishing of the products to be unstable. As a result, a joint strength and hermeticity of the products becomes unstable.

As for brazing, a condition of the clearance to obtain the products with sufficient welding strength and hermeticity becomes more difficult than that of the aforementioned welding methods. Generally, the brazing provides a relatively high joint strength with the clearance sized in a range of $3/100$ mm through $1/100$ mm. However, the joint strength significantly drops with the clearance of $1/100$ mm or less. Thus, the size management of the clearance is more delicate in brazing than in welding. Moreover, the brazing with silver-solder, for example, might bring deterioration to work environment due to generation of fluorine compounds or boron compounds during brazing.

Thus, in the conventional methods for manufacturing a filler neck by utilizing MAG welding, TIG welding or brazing, there have been existing problems of fuel evaporation due to insufficient hermeticity of a filler neck, or of low productivity. In response to the recent requests for solving these problems, the present inventors have conducted investigations to find a method for manufacturing a filler neck to joint a mouthpiece and a feeding pipe which were separately manufactured as individual members.

SUMMARY OF THE INVENTION

As a result, of the above investigation, the inventors have developed a method for manufacturing a filler neck comprising the following steps: forming a mouthpiece having a circumferential wall portion in a sectional circular shape, forming a feeding pipe having a circumferential wall portion in a sectional circular shape, fitting the circumferential wall portion of the mouth piece in the circumferential wall portion of the feeding pipe closely in an overlapped condition, and welding the circumferential wall portions at a welding area W defined in a range of an overlapped area S defined by the overlapped circumferential wall portions; characterized by that: the welding is executed by a seam welding utilizing an internal welding electrode and an external welding electrode; the internal welding electrode is a cylinder having an outer diameter smaller than an inner diameter of the circumferential wall portion of the mouthpiece, which has an electrode region on a side face of the cylinder and is inserted in the mouthpiece to press the electrode region against an inner face of the circumferential wall portion of the mouthpiece at a predetermined pressure, the external welding electrode is a flat disk having a thickness equivalent to a width of the welding area W, which has an electrode region on a circumference face of the disk and presses the circumference face thereof against an outer face of the circumferential wall portion of the feeding pipe at a predetermined pressure, and both the welding electrodes together holding the overlapped circumferential wall portions of the mouthpiece and of the feeding pipe within the welding area W therebetween, allowing the mouthpiece and the feeding pipe, the internal welding electrode, and the external welding electrode to respectively rotate at synchronized peripheral speed, applying a predetermined electric current to the internal welding electrode and the external welding electrode, and thereby integrate the mouthpiece and the feeding pipe.

It is preferable that a pressure by the internal welding electrode and the external welding electrode is set in a range of 25 through 50 MPa, and a predetermined electric current applying to the internal welding electrode and the external welding electrode is in a range of 3,000 through 7,000 A. In addition, many recent mouthpieces and feeding pipes are made of stainless steel to which the electrodes become slippery. Therefore, the internal welding electrode employs a structure that is rotatable with a rotational axis thereof which comprises a friction clutch which is built in, so that the friction clutch slips to prevent a difference in peripheral speed between the internal welding electrode and the external welding electrode.

In the present invention, the circumferential wall portion of the mouthpiece and the circumferential wall portion of the feeding pipe are jointed by seam welding in a press-fitted condition. Specifically, a welding area W established in a range of a width of the portion overlapping the circumferential wall portions of the mouthpiece and of the feeding pipe is welded apart from the overlapped peripheral edge of the feeding pipe by seam welding. As a result, there are no melting drops of the weld at the overlapped peripheral edge portion of the feeding pipe, and thereby the high hermeticity of the filler neck can be obtained. In addition, there is no scattering of spatters in the seam welding which requires no clearances at the welding area W. At the same time, the seam welding as a high-speed welding operation brings enhancement of productivity of the filler neck. Moreover, the seam welding can also achieve a reliable welding result in spite of producing tight or loose tolerances, because of that nothing of sub-materials for welding is required, nor that the shapes of the peripheral edges of the mouthpiece and the feeding pipe influences to the result of the joint.

In order to perform the seam welding under the condition of in which the welding area W is provided to the overlapped area S defined by press-fitting the circumferential wall portion of the feeding pipe over the circumferential wall portion of the mouthpiece, the circumferential wall portion of the mouthpiece is formed into a cylinder extending downwardly toward the feeding pipe, and the circumferential wall portion of the feeding pipe is formed into a cylinder having a shape substantially equal to the outer cross-sectional shape of the circumferential wall portion of the mouthpiece. Thereby, the circumferential wall portion of the feeding pipe can be fitted over the circumferential wall portion of the mouthpiece in a press-fitted condition free from occurrence of clearance therebetween. In general, the shape of the body of the mouthpiece excepting of the circumferential wall portion and the shape of the body of the feeding pipe excepting of the circumferential wall portion are in a sectional circular shape. Therefore, the circumferential wall portion of the mouthpiece is formed by reducing diameter of the body of the mouthpiece. At the same time, the circumferential wall portion of the feeding pipe is formed by enlarging diameter of the body of the feeding pipe. Since the circumferential wall portions of the mouthpiece and the feeding pipe are in an overlapped relation with each other, formation of each wall portion into a cylinder in a sectional circular shape provides flexibility in orientation of the mouthpiece relative to the feeding pipe and capability of assembly of both the circumferential wall portions at a fixed position. In addition to the above advantages, there is no deviation in strength between each circumferential wall portion as being of a cylinder in a sectional circular shape.

A fitting volume of the circumferential wall portion of the feeding pipe over the circumferential wall portion of the mouthpiece controls the region width of the overlapping area S between the circumferential wall portions of the mouthpiece and the feeding pipe in a press-fitted condition. Setting an extent of the fitting volume of the circumferential wall portions or the region width of the overlapping area S can be flexible, so long as the width of the seam welding area W stays within the overlapping area S. However, the greater the fitting volume of the circumferential wall portions of the mouthpiece and the feeding pipe becomes, the harder the press-fitting becomes. Additionally, it is not preferable, from the viewpoint of uniformity of the product's quality, that the fitting volume varies in every products. Accordingly, the circumferential wall portion of the mouthpiece may be formed by reducing in diameter of the body of the mouthpiece through a tapered portion into a sectional circular shape, an upper end of the circumferential wall portion of the mouthpiece may be defined by a boundary portion between the tapered portion and the circumferential wall portion of the mouthpiece, and thereby the circumferential wall portion of the mouthpiece may be fitted in the circumferential wall portion of the feeding pipe in a manner that the peripheral edge of the feeding pipe abuts to the upper end of the circumferential wall portion of the mouthpiece. To press-fit the circumferential wall portions in the aforementioned manner can usually set the overlapping area S in a fixed range. This means that the mouthpiece and the feeding pipe can be positioned easily at the step of the assembling prior to the welding step. Moreover, a constant seam-welding area W can be provided in a range of the overlapped area S of the circumferential wall portions of the mouthpiece and the feeding pipe. As a result, uniformity of the product's quality can be achieved.

A partition of the mouthpiece may be formed by radially and inwardly reducing a lower edge of the circumferential wall portion of the mouthpiece having a sectional circular shape as an orthogonal surface to the circumferential wall portion of the mouthpiece. An annular rib functioning as a gun guide may be formed to be downwardly projected from the partition. The internal welding electrode may be rotated while sliding an insulated nose face thereof contacting onto an inner face of the partition of the mouthpiece. A rigidity of the circumferential wall portion of the mouthpiece is enhanced by presence of the partition. A rigidity of the partition is also enhanced by presence of the annular rib. Accordingly, the shape of the circumferential wall portion of the mouthpiece can be retained by the enhanced rigidity at the step of press-fitting the circumferential wall portion of the mouthpiece in the circumferential wall portion of the feeding pipe. The annular rib functioning as a gun guide may be formed in a conical shape by gradually and successively reducing the circumferential wall portion of the mouthpiece. It is more preferable that the annular rib is integrally formed by folding the circumferential wall portion of the mouthpiece in order that the partition formed by folding the circumferential wall portion orthogonally and radially is folded vertically downward. Thus, the rotating position of the internal welding electrode during seam-welding becomes stable by the effect of the partition which supports a nose face of the internal welding electrode in sliding contact, resulting in an optimized seam welding. Since the annular rib as a gun guide extending from the partition is arranged apart from the circumferential wall portion of the mouthpiece, the circumferential wall portion of the mouthpiece can be prevented from suffering damages occurred by a filler gun's insertion. Furthermore, the annular rib of the present invention is applicable to manufacture the various types of products with a common structure in a same production line; in accordance with difference of the fuel classifications, alteration of the gun guide's diameter adjusting to the individual national standard of the device, and alteration of the structure of the filler neck depending upon the individual legal requirements.

DETAILED DESCRIPTION OF THE INVENTION

Preferred embodiments of the invention will now be described according to the drawings in the following.

A filler neck I of the present invention is characterized by a method for jointing a mouthpiece 2 and a feeding pipe 3.

Figure 1:
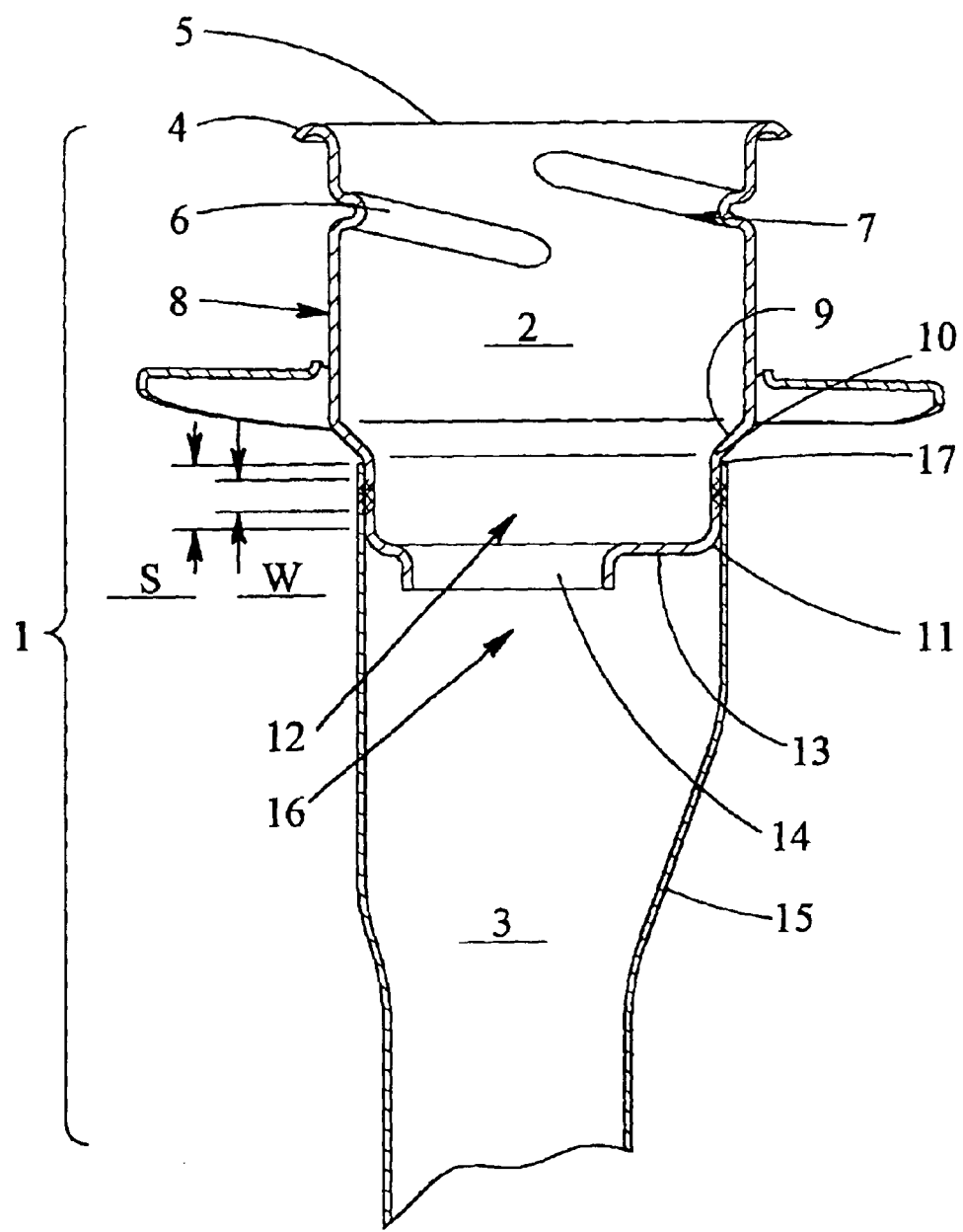
FIG. 1 is a sectional view of a filler neck according to the present invention.

As shown in FIG. 1, the mouthpiece 2 and the feeding pipe 3 do not have significant differences in appearance from conventional ones, which implies excellence in substitution of the filler neck 1 according to the present invention.

Figure 2:
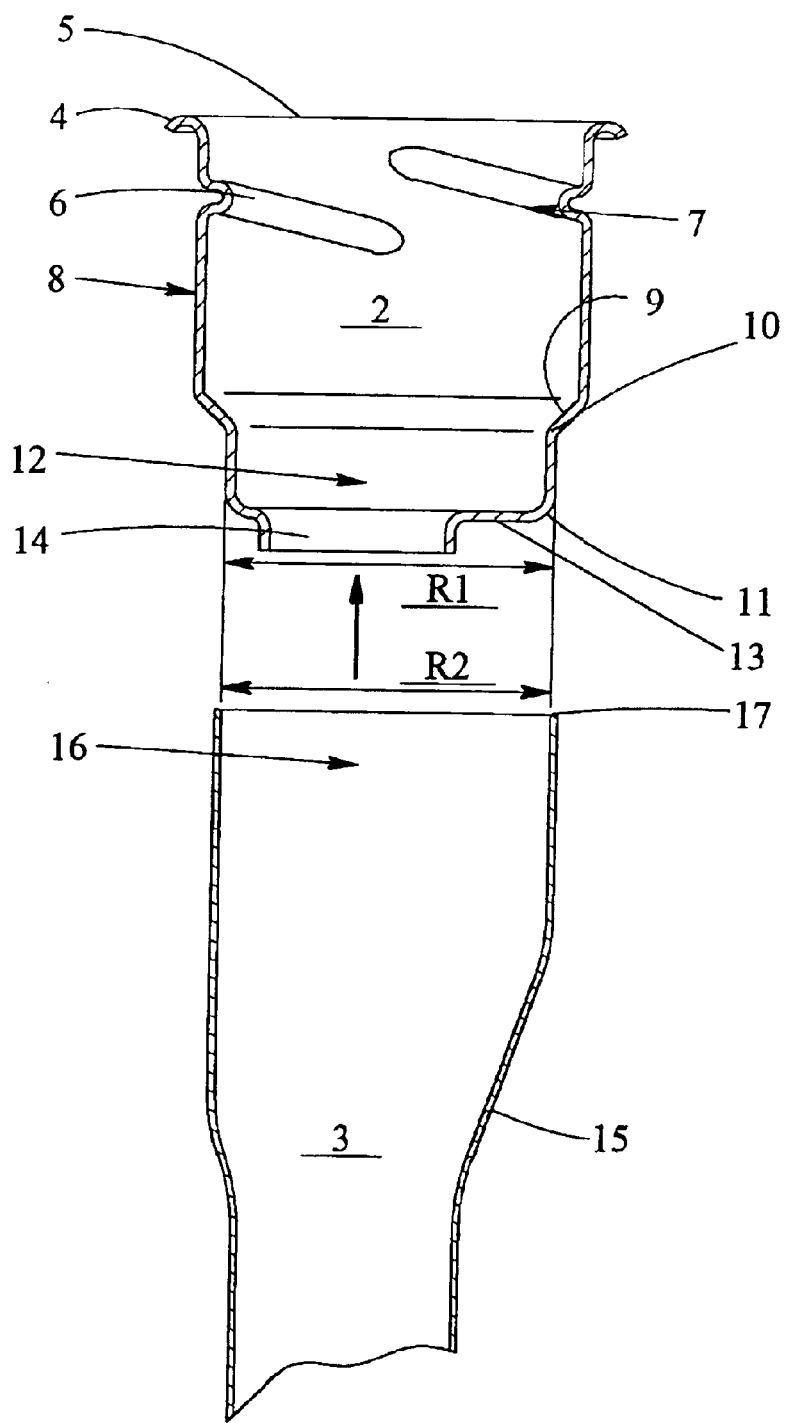
FIG. 2 is a sectional view showing a mouthpiece and a feeding pipe before assembling.

As shown in FIG. 2, the mouthpiece 2 made by an annular metal member is constructed by, in order from top in the drawing, a curled peripheral flange 4, an internal thread 7 having a thread groove 6 for screwing a fuel cap (not shown in the drawing) thereto, and a body 8 of the mouthpiece which is an original raw pipe portion, wherein the body 8 of the mouthpiece is reduced in diameter radially and inwardly through a tapered potion 9, so as to form a circumferential wall portion 12 of the mouthpiece in a sectional circular shape extending from an upper end 10 of the circumferential wall portion to a lower end 11 thereof. Further in the present embodiment, the lower end 11 of the circumferential wall portion 12 of the mouthpiece is reduced radially and inwardly to form a partition 13, so that an annular rib 14 functioning as a gun guide 14 is formed with protruding from an eccentric position of the partition 13 toward the feeding pipe 3. The partition 13 contributes as a strengthening portion to retain the shape of the lower end 11 of the circumferential wall portion of the mouthpiece 12. The annular rib 14 contributes as a strength portion to retain the shape of the partition 13.

The feeding pipe 3 is a metallic cylindrical tube. In the present embodiment, the feeding pipe 3 is constructed by an eccentric tapered portion 15 in which gradually enlarged in diameter thereof and by the circumferential wall portion 16 which is integrally formed extending from the end of the gradually enlarged eccentric tapered portion. Generally, an electric welded tube is used for a feeding pipe and remains bead weld on the inner face of the circumferential wall portion 16 of the feeding pipe, which impedes sufficient fitting of the welding area W required for a seam welding. In the present embodiment, however, the bead weld retained on the circumferential wall portion is spread to reduce its projection accompanying that the feeding pipe 3 is enlarged in diameter to form the circumferential wall portion 16 of the feeding pipe integrally through the eccentric tapered portion 15. Accordingly, secure fitting of the inner face of the circumferential wall portion 16 of the feeding pipe over the outer face of the circumferential wall portion 12 of the mouthpiece can be achieved. In addition, the circumferential wall portion 16 of the feeding pipe provided to the enlarged feeding pipe 3 improves roundness thereof and then increases the degree of fit of the inner face of the circumferential wall portion 16 of the feeding pipe over the outer face of the circumferential wall portion 12 of the mouthpiece. Thus, by the construction for fitting the circumferential wall portion 16 of the feeding pipe extending from the tapered portion 15 formed by enlarging the pipe gradually and radially over the circumferential wall portion 12 of the mouthpiece, it is suitable for performing a seam welding which brings excellent and stable hermeticity.

The present invention teaches that the circumferential wall portion 16 of the feeding pipe 3 is press-fitted in the circumferential wall portion 12 of the mouthpiece 2 and welded the outer face of the circumferential wall portion 12 of the mouthpiece and the inner face of the circumferential wall portion 16 of the feeding pipe by a seam welding. Since a seam welding requires a complete fitting at the welding area W without differential clearance, the outer diameter R1 of the circumferential wall portion 12 of the mouthpiece should be substantially equal to the inner diameter R2 of the circumferential wall portion 16 of the feeding pipe.

Figure 4:
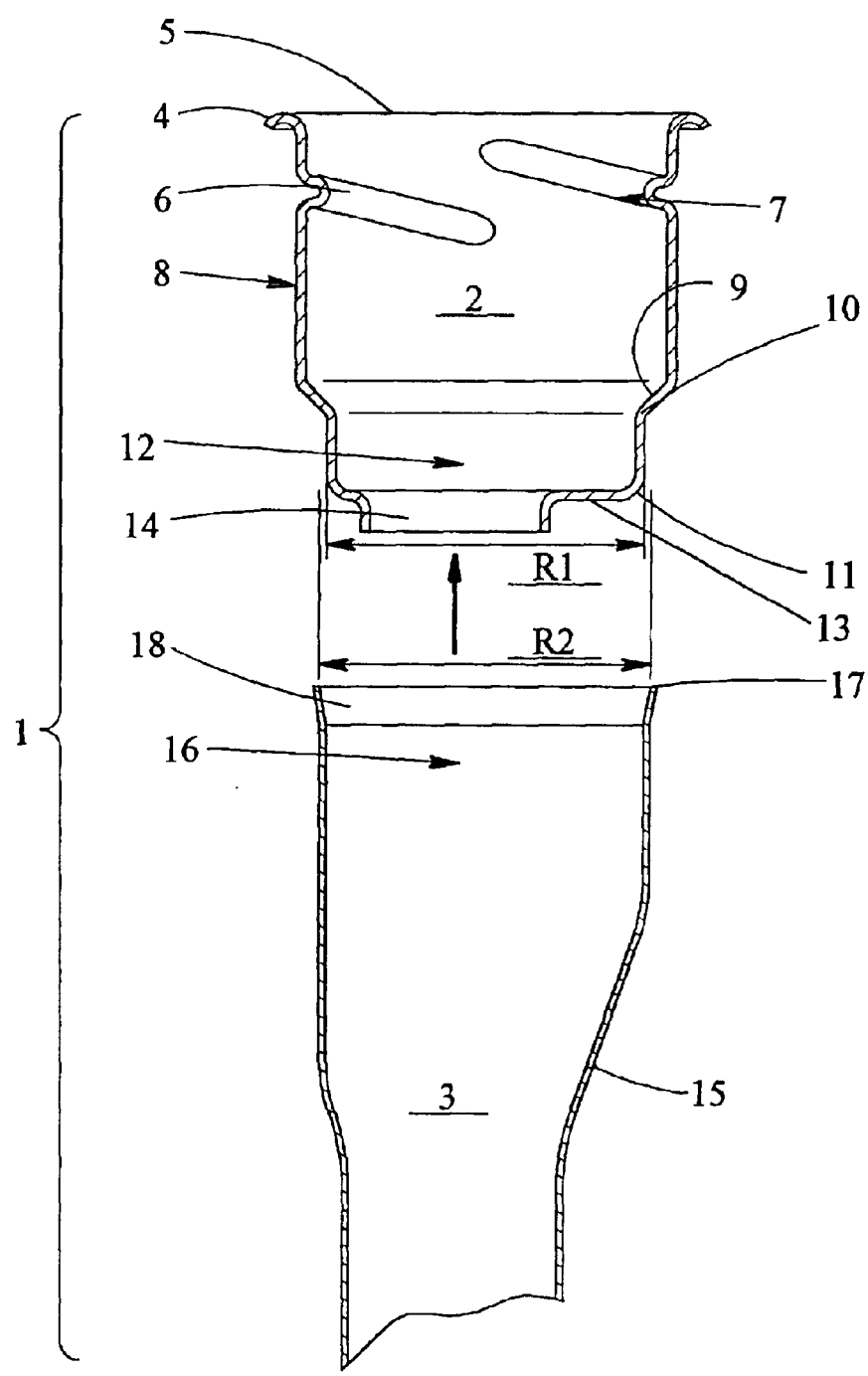
FIG. 4 is a sectional view showing an another example of FIG. 2 with a different fuel pipe.

To be specific, the outer diameter R1 of the circumferential wall portion 12 of the mouthpiece having outer diameter R1 which is larger than the inner diameter R2 of the circumferential wall portion 16 of the feeding pipe in a range of 0.00 mm to 0.3 mm, preferably 0.00 mm to 0.2 mm, is press-fitted in the circumferential wall portion 16 of the feeding pipe so as to prevent the fitted circumferential wall portions 12 and 16 from slipping. In this case, in order to obtain easy press-fitting the circumferential wall portion 12 of the mouthpiece into the circumferential wall portion 16 of the feeding pipe, as shown in FIG. 4, a guiding tapered portion 18 may be formed by enlarging a peripheral edge 17 of the feeding pipe till becoming larger diameter than the outer diameter of the circumferential wall portion of the mouthpiece. Since the welding area W to be seam-welded is set narrower than the overlapped area S, no affect is caused on the joint between the mouthpiece 2 and the feeding pipe 3 even if the guiding tapered portion. 18 is formed at the peripheral edge 17 of the feeding pipe.

A fitting volume of the circumferential wall portion 16 of the feeding pipe relative to the circumferential wall portion 12 of the mouthpiece can be fixed by abutting the peripheral edge 17 of the feeding pipe to the upper end 10 of the circumferential wall portion 12 of the mouthpiece. Accordingly, the overlapped area S administrating the welding area W to be allowed a sufficient seam welding to provide can be obtained by an appropriate fitting volume set by which is press-fitted the peripheral edge 17 of the feeding pipe till abutting to the upper end 10 of the circumferential wall portion 12.

Regarding the cost performance while securing joint strength and hermeticity, a range of the welding area W may be set between 3 mm and 9 mm, preferably between 4 mm and 8 mm, further preferably between 5 mm and 7 mm. The overlapped area S having margins in front and back each of at lease 1 mm may be sufficient for the welding area W. This relationship between the welding area W and the overlapped area S facilitates assembly of the mouthpiece 2 and the feeding pipe 3 prior to a welding operation. Since the circumferential wall portion 12 of the mouthpiece is enhanced retaining in shape by presence of the partition 13 and the annular rib 14, there is out of apprehension for deformation or damage on the mouthpiece 2 or the feeding pipe 3 when the circumferential wall portion 12 of the mouthpiece is fitted in the circumferential wall portion 16 of the feeding pipe.

Figure 3:
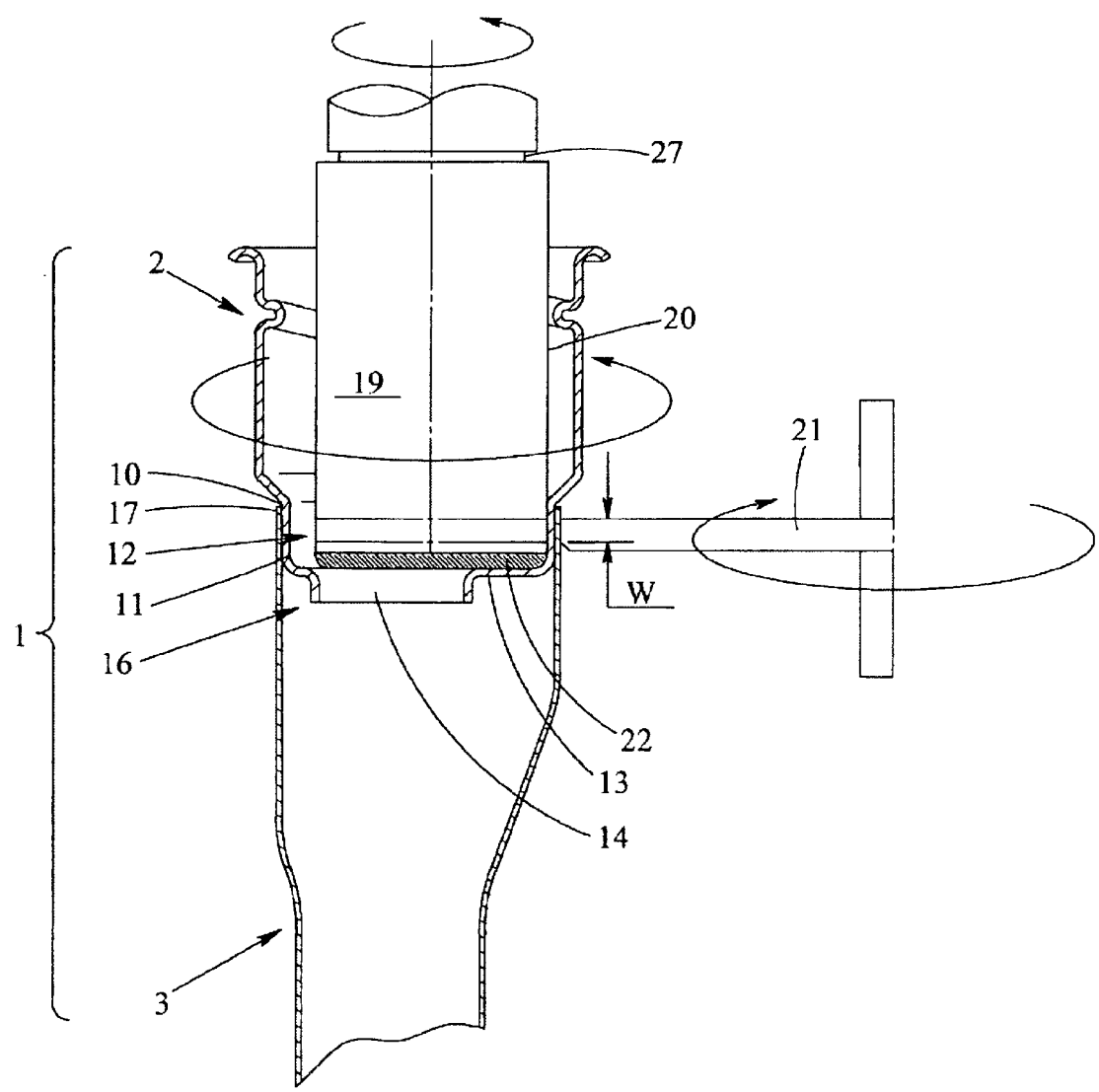
FIG. 3 is a sectional view showing a mouthpiece and a feeding pipe during operating in the seam welding after assembling.

The internal welding electrode 19, as shown in FIG. 3, is a cylinder having an outer diameter smaller than an inner diameter of the circumferential wall portion 12 of the mouthpiece, which has an electrode region on a side face 20 with pressing against the inner face of the circumferential wall portion 12 of the mouthpiece. Although it is preferable for the internal welding electrode 19 to have a larger outer diameter in respect of rigidity thereof, the outer diameter of the internal welding electrode 19 is required to be set smaller than the inner diameter of the circumferential wall portion 12 of the mouthpiece. For example, if the inner diameter of the circumferential wall portion 12 of the mouthpiece is set in 38.8 mm, then the outer diameter of the internal welding electrode 19 falls in 35.0 mm.

In order to avoid contact with any other portions from the welding area W of the inner face of the circumferential wall portion 16 of the mouth piece, such as the peripheral flange 4 folded integrally from an opening 5 of the mouthpiece 2, the external welding electrode 21 is formed into a flat disk having an electrode region on a circumference side thereof and presses the circumference side against the outer face of the circumferential wall portion 16 of the feeding pipe. The outer diameter of the external welding electrode 21 is a relative value determined by the size of the filler neck 1. For example, if the inner face of the circumferential wall portion 12 of the mouthpiece has a diameter of 38.8 mm, then the relative value falls in 250 mm or more. That is, this relative value becomes at least 6 times greater than the diameter of the internal welding electrode 19.

As seen above, there is a large radius ratio between the pair of the inner welding electrode 19 and the external welding electrode 21 for a seam welding device (not shown in the drawing) in the present invention, and the internal welding electrode 19 has a cylindrical shape and the external welding electrode 21 has a disk shape.

The internal and external welding electrodes 19 and 21 face their electrode regions toward each other, to hold the circumferential wall portion 12 of the mouthpiece and the circumferential wall portion 16 of the feeding pipe within the welding area W therebetween, respectively rotating to seam-weld the welding area W in the circumferential direction.

In this case, for the purpose of facing the electrode regions in a fixed positional relation, the individual peripheral speed of the internal welding electrodes 19 and the external welding electrodes 21 should be equalized. Therefore, the individual rotating speed of the internal welding electrode 19 and the external welding electrode 21 are in relation of the inverse ratio to the aforementioned radius ratio, i.e., the internal welding electrode 19 has a relatively high rotating speed and the external welding electrode 21 has a relatively low rotating speed.

Further, the internal welding electrodes 19 and the external welding electrode 21 will be abraded with age by the contact with each of the inner face of the circumferential wall portion 12 of the mouthpiece or the outer face of the circumferential wall portion 16 of the feeding pipe. There is a problem that, therefore, the peripheral speed of the internal welding electrode 19 which is rotating at higher speed with its smaller diameter becomes different from the predetermined speed. To solve this problem, the present embodiment suggests that a friction clutch 27 which is mounted to a rotation axis of the internal welding electrode 19, and that the internal welding electrode 19 and the external welding electrodes 21 are allowed to respectively rotate mainly based on the external welding electrode 21, and thereby corrects any difference in peripheral speed between the electrodes 19 and 21 by slipping of the internal welding electrode 19 utilizing the friction clutch 27.

In this way, the internal welding electrode 19 and the external welding electrode 21 respectively rotate mainly based on the external welding electrode 21. If the material of the mouthpiece 2 and the feeding pipe 5 generates sufficient friction against the internal welding electrode 19 and the external welding electrode 21, the mouthpiece 2 and the feeding pipe 3 are allowed to rotate accompanied with the internal and external welding electrodes 19 and 21. However, in a case where the mouthpiece 2 or the feeding pipe 3 is made of stainless steel, an insufficient amount of friction against the welding electrodes 19 and 21 will likely cause idle rotations thereof. This problem may be solved by integrally rotating the mouthpiece 2 and the feeding pipe 3 in accordance with the synchronized rotation of the internal welding electrode 19 and the external welding electrode 21. The rotation of the mouthpiece 2 and the feeding pipe 3 perform in the same direction of rotation of the internal welding electrode 19. And a peripheral speed of the mouthpiece 2 and the feeding pipe 3 is synchronized with a peripheral speed of the internal welding electrode 19 and the external welding electrode 21. This synchronization of the peripheral speed is automatically achieved by the friction clutch 27 to allow the internal welding electrode 21 to slip.

While providing rotation to the mouthpiece 2 and the feeding pipe 3, as described above, by rotating the inner welding electrode 19 which presses against the inner face of the circumferential wall portion 12 of the mouthpiece 2 and by rotating the outer welding electrode 21 which presses against the outer face of the circumferential wall portion 16 of the feeding pipe 3, the seam welding of the present invention is carried out by applying a predetermined electric current intermittently between the internal welding electrode 19 and the external welding electrode 21. Thus, the overlapped outer face of the circumferential wall portion of the mouthpiece and inner face of the circumferential wall portion of the feeding pipe is melted momentarily by electric heat, thereby completing the welding.

In a case where stainless steel having a thickness of 1.2 mm is used for the circumferential wall portion 12 of the mouthpiece and the circumferential wall portion 16 of the feeding pipe, a pressure of the electrodes may be set in a range of 25 MPa through 50 MPa and an electric current value on the electrodes may be set in a range of 3,000 A through 7,000 A. Preferably, the pressure may be set in a little less than 40 MPa and the electric current value may be set in about 4,000 A respectively. These values are relatively smaller than typical values for seam welding.

Application of the above-mentioned pressure and electric current, however, should be limited within the welding area W since distribution of the electric current out of the welding area W causes reduction of the electric current value to the welding area W, resulting in insufficient seam welding. In the present invention, the contact of the external welding electrode 21 with the outer face of the circumferential wall portion 16 of feeding pipe is limited to the width of the circumference face of the disk 21. At the same time, there is an apprehension that the nose face 22 of the internal welding electrode 19 will contact accidentally to the partition 13 integrally formed by extending radially and inwardly from the circumferential wall portion 12 of the mouthpiece. Therefore, the nose face 22 is insulated not only to prevent any shunt current, but also to obtain a stable rotation of the internal welding electrode in sliding contact with the inner face of the partition. In the internal welding electrode 19, the side face 20 thereof slidingly contacts in sliding with the inner face of the circumferential wall portion of the mouthpiece, and the nose face 22 thereof also slidingly contacts with the inner face of the partition 13. As a result, the internal welding electrode 19 and the external welding electrode 21 contact to the mouthpiece 2 and the feeding pipe 3 in a stable attitude, thereby an excellent seam welding can be achieved.

A filler neck according to the manufacturing method in the present invention has an excellent hermeticity. This is resulted by that the circumferential wall portion of the mouthpiece is press-fitted in the circumferential wall portion of the feeding pipe to thereby carry out a seam welding thereon. By the seam welding, for example, there is an advantage that no clearances for welding in other method or brazing are required in a range of the welding area W. Accordingly, the outer face of the circumferential wall portion of the mouthpiece and the inner face of the circumferential wall portion of the feeding pipe can be overlapped closely. In the present invention, the circumferential wall portions of the mouthpiece and of the feeding pipe both having a diameter which is substantially equal to the other are press-fitted, thus to obtain the above closely overlapped condition.

Further, the seam welding according to the present invention is performed such that the internal and external welding electrodes together hold the mouthpiece and the feeding pipe therebetween. This welding method eliminates an additional requirement of jigs used in conventional methods for supporting the feeding pipe or the like. Thus, the improvement of productivity can be achieved in the present invention. In particular, the circumferential wall portions of the mouthpiece and of the feeding pipe overlapped in a press-fitted condition can prevent both the wall portions from slipping off until a seam-welding step. It allows an easier handling of the mouthpiece and the feeding pipe in welding operation.

What is claimed is:

1. A method for manufacturing a filler neck comprising the following steps:

forming a mouthpiece having a body with a circumferential wall portion in a sectional circular shape, forming a feeding pipe having a circumferential wall portion in a sectional circular shape, fitting the circumferential wall portion of the mouthpiece in the circumferential wall portion of the feeding pipe in a closely overlapped condition, and welding the circumferential wall portions at a welding area W defined in a range of an overlapped area S defined by the overlapped circumferential wall portions;

wherein that:

the step a welding is executed by a seam welding utilizing an internal welding electrode and an external welding electrode;

the internal welding electrode being a cylinder having an outer diameter smaller than an inner diameter of the circumferential wall portion of the mouthpiece, said internal electrode having an electrode region on a side face of the cylinder and wherein the internal welding electrode is inserted in the mouthpiece to press the electrode region against an inner face of the circumferential wall portion of the mouthpiece at a predetermined pressure, the external welding electrode being a flat disk having a thickness equivalent to a width of the welding area W, said external welding electrode having an electrode region on a circumference face of the disk and wherein said external welding electrode presses the circumference face thereof against an outer face of the circumferential wall portion of the feeding pipe at a predetermined pressure, and both welding electrodes together holding the overlapped circumferential wall portions of the mouthpiece and of the feeding pipe within the welding area W therebetween, allowing the mouthpiece and the feeding pipe, the internal welding electrode, and the external welding electrode to respectively rotate at synchronized peripheral speed, applying a predetermined electric current to the internal welding electrode and the external welding electrode, and to thereby integrate the mouthpiece and the feeding pipe.

2. The method for manufacturing a filler neck according to claim 1, wherein a pressure by the internal welding electrode and the external welding electrode is set in a range of 25 through 50 MPa, and a predetermined electric current applied to the internal welding electrode and the external welding electrode is in a range of 3,000 through 7,000 A.

3. The method for manufacturing a filler neck according to claim 1, wherein the internal welding electrode is rotated with respect to a rotation axis thereof, a friction clutch is built into the internal welding electrode so that the friction clutch slips to prevent difference in peripheral speed between the internal welding electrode and the external welding electrode.

4. The method for manufacturing a filler neck according to claim 1, wherein the circumferential wall portion of the mouthpiece is formed by radially reducing the body of the mouthpiece through a tapered portion into the sectional circular shape, an upper edge of the circumferential wall portion of the mouthpiece is defined to be a boundary portion between the tapered portion and the circumferential wall portion of the mouthpiece, and thereby fits the circumferential wall portion of the mouthpiece in the circumferential wall portion of the feeding pipe in a manner where a peripheral edge of the feeding pipe abuts the upper edge of the circumferential wall portion of the mouthpiece.

5. The method for manufacturing a filler neck according to claim 1, wherein a partition of the mouthpiece is formed by radially and inwardly reducing a lower edge of the circumferential wall portion of the mouthpiece having the sectional circular shape as being of an orthogonal surface to the circumferential wall portion of the mouthpiece, an annular rib functioning as a gun guide is integrally formed to be downwardly projected from the partition, and the internal welding electrode rotates while sliding an insulated nose face of the internal welding electrode onto an inner face of the partition of the mouthpiece.

* * * * *